329
United States Patent [19]
Nelson

[11] Patent Number: 5,162,935
[45] Date of Patent: Nov. 10, 1992

[54] FIBER OPTICALLY ISOLATED AND REMOTELY STABILIZED DATA TRANSMISSION SYSTEM

[75] Inventor: Melvin A. Nelson, Santa Barbara, Calif.

[73] Assignee: The United States of America as represented by the Department of Energy, Washington, D.C.

[21] Appl. No.: 717,580

[22] Filed: Jun. 19, 1991

[51] Int. Cl.⁵ ............................................. H04B 10/00
[52] U.S. Cl. .................................... 359/143; 359/171; 250/227.21
[58] Field of Search ........ 359/142, 143, 144, 152-153, 359/167, 171, 173, 187; 340/870.02; 250/227.21, 551

[56] References Cited

U.S. PATENT DOCUMENTS

| | | | |
|---|---|---|---|
| 3,905,010 | 9/1975 | Fiztpatrick | 359/144 |
| 3,984,824 | 10/1976 | Blackburn | 340/870.29 |
| 4,012,633 | 3/1977 | Huntley | 359/162 |
| 4,119,948 | 10/1978 | Ward et al. | 340/870.02 |
| 4,294,682 | 10/1981 | Deczky | 359/144 |
| 4,408,307 | 10/1983 | Harris | 359/158 |
| 4,556,280 | 12/1985 | Bagby | 385/19 |
| 4,651,571 | 3/1987 | McGlade | 250/227.11 |
| 4,677,982 | 7/1987 | Llinas et al. | 359/143 |
| 4,810,891 | 3/1989 | Maschek et al. | 359/144 |

Primary Examiner—Edward L. Coles, Sr.
Assistant Examiner—Kinfe-Michael Negash
Attorney, Agent, or Firm—Miguel A. Valdes; Roger S. Gaither; William R. Moser

[57] ABSTRACT

A fiber optically isolated and remotely stabilized data transmission system is described wherein optical data may be transmitted over an optical data fiber from a remote source which includes a data transmitter and a power supply at the remote source. The transmitter may be remotely calibrated and stabilized via an optical control fiber, and the power source may be remotely cycled between duty and standby modes via an optical control fiber.

13 Claims, 3 Drawing Sheets

FIBER OPTICALLY ISOLATED AND REMOTELY STABILIZED DATA TRANSMISSION SYSTEM

The invention described herein arose in the course of, or under, Contract No. DE-AC08-8NV10617 between the United States Department of Energy and EG&G Energy Measurements, Inc.

BACKGROUND OF THE INVENTION

Acquisition of data through transmission of the data from a remote source is desirable when the data source is inaccessible for direct processing of the data. For example, when acquiring data from a well such as a gas or oil well, the data must be collected within the well and transmitted from the well to a surface source for processing. This can involve provision of a signal transmission line, a control line, and a power line into and from the remote data source. When such lines constitute electrical connections to the remote data source, such electrical lines can create further data acquisition problems due to the generation of electromagnetic noise in the signal lines, as well as crosstalk between the lines if the lines are not adequately shielded.

The power line may also be dispensed with if a power source such as a battery can be located at the remote power source. However, this may necessitate periodic replacement of the power source, which may not be simple if, for example, the battery is located within a well or in a radioactive area from which data is to be remotely sampled.

It is also possible to use optical fibers rather than electrical lines for both data transmission as well as for control lines to control the transmission of data. The use of optical fibers, rather than electrical lines permits higher quality data transmission free of noise generated by conventional electrical lines.

Blackburn U.S. Pat. No. 3,984,824 describes a system wherein an analog signal is fed into a transmitter which amplifies the signal and feeds it to an LED wherein the electrical signal is converted to a light signal which is transmitted over an optical fiber to a receiver where the light output is converted back to an electrical signal via a photocell. The output from the photocell is fed through another amplifier to an output terminal from which a signal may be directly coupled to an oscilloscope for visual determination of signal communication.

Huntley U.S. Pat. No. 4,012,633 teaches a system for transmitting low level analog signals which uses a frequency modulator and a photo-diode for converting incoming electrical signals into frequency modulated light signals which are transmitted either by a fiber optic bundle or through air to a photo-transistor to convert the optical signals back to electrical signals.

Ward et al. U.S. Pat. No. 4,119,948 describes a remote meter reading system for electric power meters wherein signals are generated, digitized, and stored representing the amount of power used. In response to interrogation by laser radiation pulses from a remote source, the stored signals can be transmitted to the remote source by emitted pulses of laser radiation.

Deczky U.S. Pat. No. 4,294,682 teaches a data acquisition system for a hot metal handling operation such as an aluminum pot-line wherein a mobile service crane is provided with a transceiver and a second transceiver is mounted in a stationary position on a wall of the building. Information concerning an individual aluminum reduction pot is optically transmitted from the transceiver on the crane to the stationary transceiver via laser or light emitting diode. The stationary transceiver is, in turn, linked to a computer which will issue certain commands for adjustment of the parameters controlling the pot based on this data. These commands are also optically transmitted from the stationary transceiver back to the mobile transceiver.

Harris U.S. Pat. No. 4,408,307 discloses an optical transmission system wherein status and seismic data from remote digital data acquisition units is transmitted via an optical fiber cable to a master station The master station also uses an optical fiber cable to transmit command signals back to the digital acquisition units Bagby U.S. Pat. No. 4,556,280 teaches the use of a single optical fiber cable for two way transmission of signals between a central station and a remote station, using a shutter element in the remote location movable between two positions. The shutter element and the interior of the housing surrounding the end of the cable have cooperating light reflecting and light absorbing surfaces which are effective in one position of the shutter element to absorb unmodulated light transmitted from the central station over the cable to the remote location and prevent the same from being transmitted back over the cable In the other position of the shutter element, unmodulated light, transmitted to the remote station, is reflected back over the cable to the central station McGlade U.S. Pat. No. 4,651,571 discloses a strain sensor system wherein a crystal element at a first location is caused to vibrate at its resonant frequency by pulses of light from a laser at a second location, which pulses are transmitted along an optical fiber to the crystal element. A signal derived from this vibration is amplified and then used to control the pulses of a light emitting diode which is also at the first location These pulses from the LED are transmitted along another optical fiber back to the second location.

Despite the fact, however, that many systems have been proposed for the transmission of data via optical fibers from remote locations, including even provision for the use of optical fibers for control of the data transmission, there remains a need for a battery operated remote optical fiber data transmission system wherein the battery may be remotely switched between power and standby states to conserve energy and the entire system may be remotely calibrated, including temperature compensation, with low battery drain. Furthermore, the system should be able to optically transmit the data in a proportional, preferably linear, manner to achieve data integrity, in addition to digital pulse transmission.

SUMMARY OF THE INVENTION

It is, therefore, an object of this invention to provide a fiber optically isolated and remotely stabilized data transmission system wherein optical data may be transmitted over an optical data fiber from a remote source which includes a data transmitter and a power supply at the remote source, the transmitter may be remotely calibrated and stabilized via an optical control fiber, and the power source may be remotely cycled between duty and standby modes via an optical control fiber.

These and other objects of the invention will become apparent from the following description and accompanying drawings.

DESCRIPTION OF THE INVENTION

Figure 1:
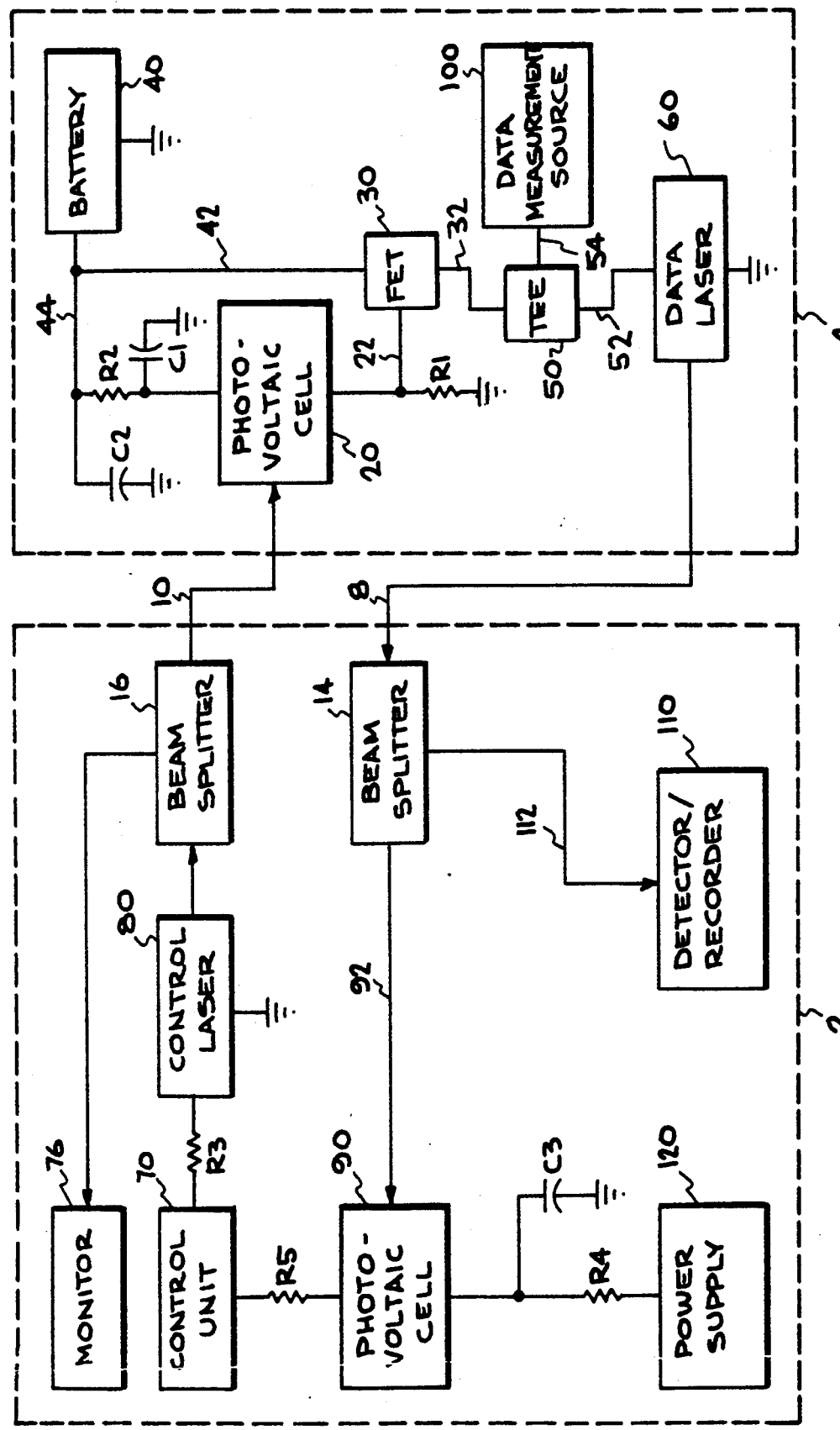
FIG. 1 is a schematic diagram of the remote data transmission system of the invention.

Turning now to FIG. 1, the remote data transmission system is shown as comprising two stations: the main control and receiving station within dotted lines 2, and the remote data transmission station within dotted lines 4. Linking the two stations together, at least in this embodiment, are two optical fibers: data transmission optical fiber 8, and control optical fiber 10.

When an optical control signal passes over optical control fiber 10 to transmission station 4, the light signal falls on a detector or photovoltaic cell 20, which converts the light signal to an electrical signal which is passed to the control electrode (gate) of an FET 30, or electronic circuit of equivalent response, permitting power from battery power source 40 to flow to data transmission laser 60. Data from data source 100 also flows to data laser 60 to modulate the laser beam, and the modulated light signal is then transmitted over optical data transmission fiber 8 to detector/recorder 110.

However, when remote transmitter station 4 is located in an inaccessible location, it is particularly important that battery power be conserved. Furthermore, when transmitter station 4 is located in such an inaccessible location, remote control of the calibration of data transmission laser 60 is also important: as well as the provision of means, in the main or control unit, for compensating for fluctuation of other parameters in the system such as temperature changes.

Therefore, the remote data transmission system of the invention is provided with control means for cycling the battery between duty and standpoint operation, for calibrating the optical data transmission, and compensating for changes in operating parameters such as temperature. While portions of such control means may be located either in main control/data receiving unit 2 and other portions may be located in remote transmission unit 4, the control means are operated from main control unit 2, i.e., no access to remote unit 4 is necessary to accomplish these objectives, as will now be explained below.

a. General Operation and Control of Battery Duty Cycle

When an optical control signal passes over optical control fiber 10 from control laser 80 to detector or photovoltaic cell 20, the light signal is converted by cell 20 to an electrical signal which is passed to the control electrode (gate) of FET 30 via electrical line 22. FET 30 acts as a variable resistor or electronic potentiometer permitting current to flow from a battery power source 40 to data transmission laser 60 proportional to the electrical signal from detector 20, which, in turn, is proportional to the amount of light transmitted over optical control fiber 10 from control laser 80. Power flows from battery 40 to data laser 60 through electrical line 42, FET 30, electrical lines 32 and 52 and tee 50.

Thus, the flow of power from battery 40 to data laser 60 is controlled by the amount of light transmitted to photovoltaic cell 20 over optical control fiber 10 by control laser 80.

Therefore, in its simplest form, when control laser 80 is not in a lasing state, no light is transmitted over optical fiber 10 to cell 20, no electrical signal is sent from cell 20 to FET 30 to place FET 30 in a conducting state, and FET 30 therefore does not permit the flow of current from battery power source 40 to data laser 60.

It will be noted that the optical output of control laser 80 is coupled to a beam splitter 16 which permits a portion of the optical signal, e.g., from about 1% to about 10% of the signal, to be optionally transmitted to a monitor 76 where the light output from control laser 80 may be visually monitored if desired. Beam splitter 16 may comprise any commercially available beam splitter such as, for example, model FOMS-850P, available from the Kaptron Company. Such beam splitters are commercially available to split an optical beam into ratios varying from 50:50 to as much as 99:1.

Figure 2:
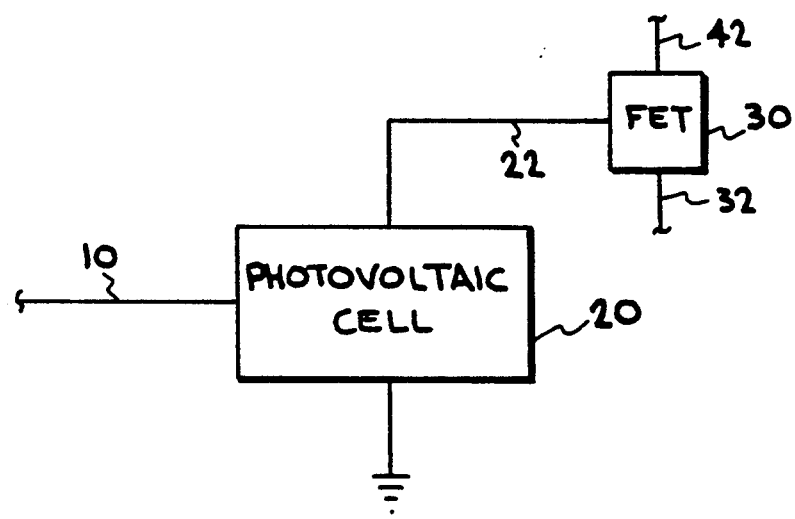
FIG. 2 is a schematic diagram of a variation of the detector portion of the remote station in the system of FIG. 1 wherein the detector is not powered by the battery.

Photovoltaic cell 20 is a commercially available photocell such as, for example, an FOD-100 silicon photo diode, available from the EG&G Corporation. It may be used without power from battery 40, as shown in FIG. 2 and as will be explained in more detail below. Preferably, however, it is used in a powered state to permit a higher electrical output signal to be available to control FET 30. For example, when battery 40 has a voltage of 12 volts, the maximum output voltage of photovoltaic cell will be about 8 volts, when cell 20 is used in a battery powered state.

To provide battery power to cell 20, as shown in the embodiment of FIG. 1, one side of cell 20 is connected to ground through resistor R1 having a value of about 50 Ω, and the other side of cell 20 is connected to battery 40 through line 44 and resistor R2 having a value of about 10,000 Ω. Any AC noise components in the connection between battery 40 and cell 20 are grounded through capacitors C1 and C2 respectively connected to sides of resistor R2. C1 has a nominal value of about 0.01 microfarads ($\mu$fd) and C2 has a nominal value of about 10 $\mu$fd.

FET 30, which acts as a variable resistor or electronic potentiometer having a maximum voltage rating of 60 volts and a current rating of up to 2 amps for this application, is commercially available as a type VN10KM from the Motorola Company. FET 30 should have a very low leakage current when in the off or standby position to opposite thereby conserve battery power. A leakage current flow in nanoamps or picoamps would, therefore, be preferred. When in the fully on state, however, the impedance of the device should be very low, i.e., less than 2 Ω. Most preferably, the response (change in resistance) of FET 30 in between the fully off and fully on states will be linear over a large range in this circuit embodiment.

The output power from FET 30 flows through a tee 50 where the DC signal carried by line 32 from battery 40 is mixed with, and modulated by, a data signal carried by line 54 from data measurement source 100, and the modulated signal is then passed to data laser 60 via line 52. This modulated electrical signal from tee 50 results in a modulated laser light output (i.e., variations in light intensity) from data laser 60 which modulated light output is transmitted back to receiver station 2 via optical transmission fiber 8 to a detector/recorder 110 which might, for example, comprise a detector and oscilloscope, or a streak camera which would record this light pattern.

Tee 50 is a commercially available component, such as a type 5550B bias tee available from the Picosecond Pulse Labs, which permits a DC input signal and an AC input signal to be mixed together to form a modulated DC output signal. In the commercially available model just identified, Tee 50 is internally provided with an inductance connected to the DC input to prevent an AC signal from being passed back through line 32 and a capacitance connected to the AC input to block the DC signal entering through line 32 from feeding back to data source 100 via line 54. Optionally, of course, such inductance and capacitance could be provided by discreet components, respectively, in lines 32 and 54.

Data measurement source 100 may comprise any data measurement device with an AC or AC modulated signal. An example might be a geiger counter when remote transmission station 4 is mounted in a well.

Data laser 60 may comprise any commercial laser that has a frequency response adequate to acquire the data of interest from source 100, optical power output sufficient for signal acquisition by detector-recorder 110, a linear or predictable response to the data signal, and an optical emission wavelength suitable for low light loss over optical fiber 8 to the recording location. A commercially available example of a laser possessing these characteristics is a model 1510B laser, available from the Ortel Corporation.

Optical fibers 8 and 10 may both comprise general purpose low frequency optical fibers such as 50-micron core, 125-micron diameter fibers, available from the Siecor Company. Alternatively, when high frequency data is to be transmitted, optical data fiber 8 may comprise a high bandwidth optical fiber such as 9-micron core fiber, also available from the Siecor Company. However, due to the additional costs associated with the use of a high bandwidth control laser 80 and optical fiber 10 for high frequency applications, the use of such a high bandwidth laser and optical fiber will be avoided unless necessary.

Battery 40, which is used as the power source for data laser 60 and also, in the embodiment of FIG. 1, as the power source for cell 20, may comprise any battery capable of providing a current of from about 10 to about 100 milliamps at a voltage level ranging from about 10 to about 15 volts, such as, for example, a lithium battery or a lead-acid battery. The total power capabilities (ampere/hour capacity) of battery 40 will vary depending upon how often and long the test and calibration routines occur, the duty cycle of data acquisition, the length of service desired, and environmental effects on the battery charge capacity. Typically, when data laser 60 is a 5 milliwatt laser, and the combined operating time is 60 minutes per day in a relatively benign environment, the battery should have an ampere/hour capacity of 6 for each month of service desired.

It should be noted that in many circumstances the system could be provided with a recharging capability using, for example, solar cells or by providing a third optical fiber which would be connected to a photovoltaic cell acting as a trickle charger to charge the battery during non-duty periods.

b. Calibration of Data Laser Output

While as described above, the transmission of an optical control signal from control laser 80 across optical control fiber 10 will act to control the duty cycle of battery 40 by turning off the flow of power through FET 30 from battery 40 to data laser 60, it is also necessary to calibrate the output of data laser 60, i.e., to accurately determine the relationship between the changes in intensity of the laser light from data laser 60 to the changes in the electrical signal from data source 100.

Such calibration can be carried out remotely, i.e., from main control station 2 rather than remote unit 4, using control unit 70, a commercially available unit available as a Precision Current Source device from the ILX Lightware Corp. Control unit 70 sends an electrical current, of known value, through resistor R3 to control laser 80 which converts the current to an optical signal which is sent over optical control fiber 10 to photovoltaic cell 20 where, as previously described, a voltage signal is generated, proportional to the intensity of the transmitted light. The voltage signal, in turn, is fed via line 22 to FET 30 which permits a voltage to flow from battery 40 to data laser 60 proportional to the electrical signal from cell 20. This, in turn, causes a light signal to be fed back across optical data fiber 8 from data laser 60 proportional to the electrical signal from control unit 70.

From known data with respect to amount of voltage passing through FET 30 per volt of signal from control unit 70 and the effect of this voltage flowing through FET 30 on the intensity of the light output from data laser 60, one can then relate the signal strength of data source 100 to the light output change from data laser 60 due to the signal level of data source 100.

For example, if one knows that a change of 1 volt in the calibration voltage flowing from control unit 70 through R3 to control laser 80 will result in a change of 2 volts flowing through FET 30 to data laser 60, then one can measure the light intensity transmitted over optical data fiber 8 from data laser 60 at a first voltage, then raise the voltage into control laser 80 by 1 volt and compare the difference in the two light outputs from data laser 60. Since this difference represents a 2 volt difference of the potential flowing through FET 30 to data laser 60, this difference in light output then also equals a difference in signal voltage of 2 volts from data source 100.

c. Feedback Loop with System Change Compensation

In addition to remote calibration of the data source, it is necessary to provide a feedback loop which will feed a high enough background signal to FET 30 (during the transmission or duty cycle) to put data laser 60 into its threshold operating point for lasing. While some systems provide for such feedback from the data laser directly to the FET, this does not compensate for other system changes such as, for example, temperature changes or changes in the level of transmission over the optical control and/or data fibers. Furthermore such a feedback loop from data laser 60 directly back to FET 30, being limited to the remote station, would derive all of its power from the remote station power, i.e., use battery power. In accordance with the invention, provision is made for a feedback control loop which monitors and compensates for changes across the entire system, and which derives at least a portion of its power from the main or control station.

As seen in FIG. 1, the light transmitted from remote station 4 back to control station 2 passes through a beam splitter 14 wherein a portion of the optical signal from data laser 60 passes over optical fiber 92 to photovoltaic cell 90, while the balance of the optical signal travels over optical fiber 112 to detector/recorder 110. Beam splitter 14 is a commercially available unit available from the Kaptron Company as model FOMS-850P. Beam splitter 14 passes about 5% of the incoming optical signal over optical fiber 92 to cell 90, with the balance, comprising the main portion of the optical signal, passed over optical fiber 112.

Photovoltaic cell 90 may be connected through resistor R4, having a resistance of about 10,000 Ω, to a separate power supply 120 to provide amplification of the signal, with any AC noise component grounded through capacitor C3, having a capacitance of about 0.01 μfd. The output of cell 90 may be fed back to control unit 70 through resistor R5, having a resistance of about 1000 Ω. Alternatively control unit 70 may have the function of cell 90 built into the control unit, in which case, the optical signal carried on fiber 92 may be fed directly into control unit 70.

In any event, a portion of the light output signal from data laser 60 reaches control unit 70 and the output electrical signal from control unit 70 fed back to control laser 80 through R3 is inversely related to the strength of the light output of data laser 60. Thus, if light reaching control unit 70 decreases due to extraneous factors effecting optical fiber 10, photocell 20, FET 30, tee 54, data laser 60, or optical fiber 8, the electrical signal to control laser 80 is increased resulting in an increase in the optical signal strength reaching cell 20. This increased optical signal is converted to an electrical signal fed to the gate of FET 30 resulting in a higher power level being fed from battery 40 to data laser 60.

In this manner the transmission of optical and electrical signals across the entire system is monitored and compensated for by control unit 70 to maintain the calibrated light output of data laser 60 at a selected level during transmission cycles. The data pulse from data source 100 may be of very short duration, in which case, the feedback control signal will be seen by the system as a steady signal compared to the comparatively brief data signal.

Turning now to FIG. 2, a modification of the embodiment of FIG. 1 is shown wherein photovoltaic cell 20 is self-powered, i.e., not connected to an external power source. In this embodiment, one side of the cell is grounded while the other output terminal is connected directly to the gate of FET 30 to provide the electrical control signal to FET 30.

Figure 3:
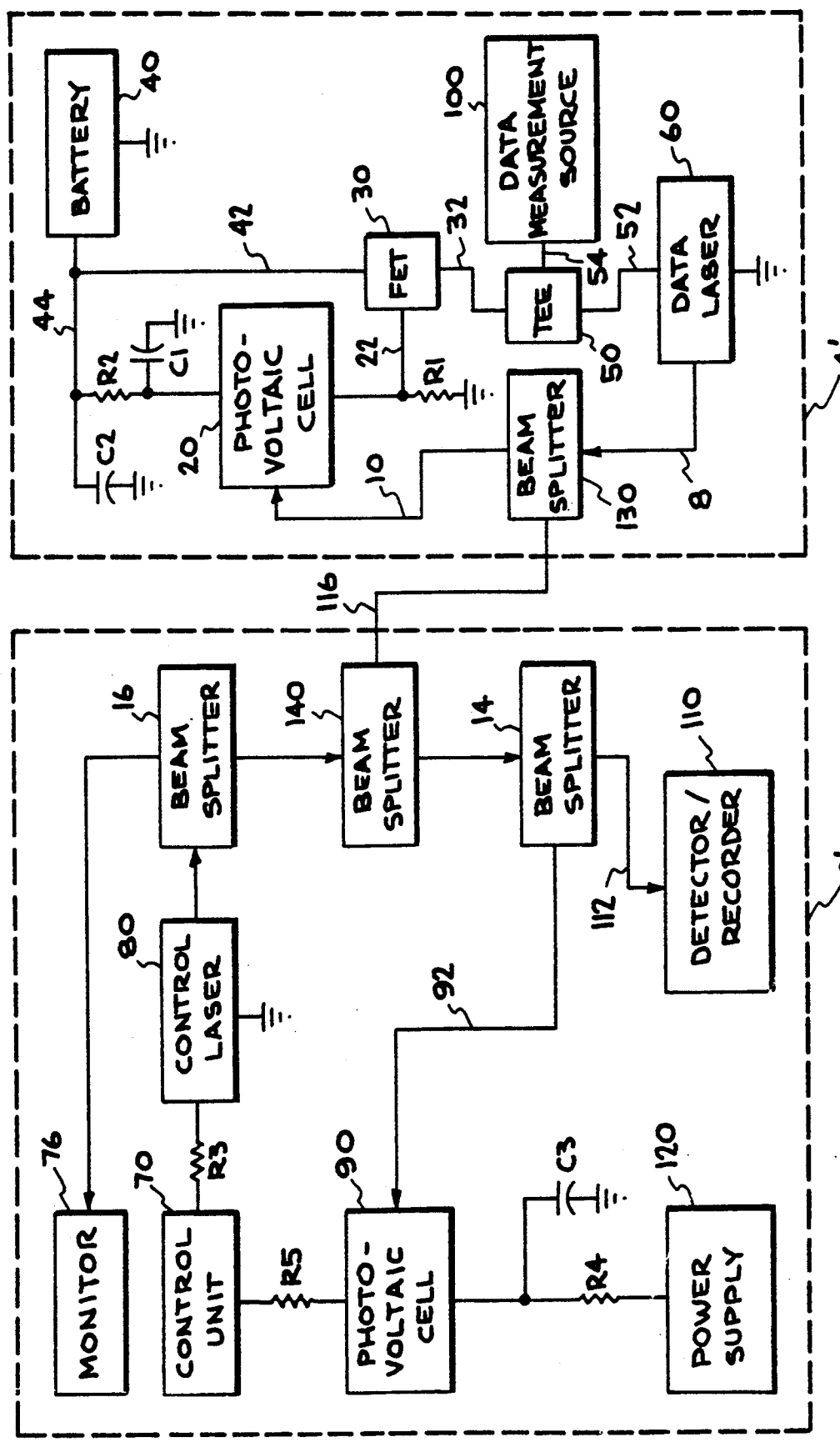
FIG. 3 is a schematic diagram of a variation of the transmission system of FIG. 1 wherein a single optical fiber is used both for data transmission as well as for control signals.

Yet another embodiment is shown in FIG. 3 wherein a single optical fiber 116 couples main control station 2' to remote station 4'. In this embodiment, a first beam splitter 140 in control station 2' is connected to one end of optical fiber 116 and a second beam splitter 130 in remote station 4' is connected to the opposite end of optical fiber 116. Beam splitter 140 couples the optical signal from fiber 116 to both beam splitter 14 and beam splitter 16, while beam splitter 130 couples the optical signal from fiber 116 to both cell 20 and data laser 60. When a single optical fiber is used, the control signal and data signal may be transmitted at difference frequencies. However, the data pulse may be of very short duration, in which case, the control signal will be seen by the system as a steady signal compared to the relatively brief data pulse.

Thus, the invention provides for the transmission of data from a remote source using optical fibers both for the transmission of the data as well as the control of the system. Control means are provided in the main station for remote control of the duty cycle of the power source in the remote station, as well as calibration of the data laser in the remote station. In addition the control means in the main station include a feedback loop which controls the minimum power level fed to the data laser to maintain it at a calibrated cw light output point and compensates for changes in the entire system, such as changes in the temperature.

While specific embodiments of the apparatus constituting the optical fiber data transmission system of the invention have been illustrated and described for the remote optical transmission of data and control of such transmissions in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. Apparatus for optically transmitting data from a remote source including apparatus for optically controlling such data transmission which comprises:
   a) means for providing an optical control signal from a main station to a remote station, including an optical control source in said main station, control means in said main station for controlling said optical control source, and an optical fiber between said main station and said remote station;
   b) photovoltaic means in said remote station for converting said optical control signal to an electrical control signal;
   c) FET means in said remote station for controlling the flow of power from a power source in said remote station to an optical data source in said remote station in response to said electrical control signal from said photovoltaic means;
   d) data collection means for providing an electrical data signal to said optical data source for conversion to an optical data signal for transmission back to said main station from said remote station; and
   e) means in said main station for feeding a portion of said optical data signal to said control means.

2. The apparatus of claim 1 wherein said optical control source is a control laser for sending an optical control signal from said main station to said photovoltaic means in said remote station in response to an electrical signal from said control means.

3. The apparatus of claim 1 wherein said optical data source in said remote station is a data laser powered by said power source in said remote station.

4. The apparatus of claim 1 wherein said means in said main station for feeding a portion of said optical data signal to said control means comprise an optical beam splitter.

5. Apparatus for optically transmitting data from a remote source and for optically controlling such data transmission which comprises:
   a) means for providing an optical control signal from a main station to a remote station including:
      1) an optical fiber;
      ii) an optical control source in said main station to provide said optical control signal for transmission to said remote station via said optical fiber;
      iii) control mean sin said main station to control said optical control source, including means for sending an electrical signal to said optical control means;
   b) photovoltaic means in said remote station for converting said optical control signal to an electrical control signal;

c) power flow control means in said remote station for controlling the flow of power from a power source in said remote station to an optical data source comprising a laser in said remote station in response to said electrical control signal from said photovoltaic means, said power flow control means comprising an FET having its gate electrically coupled to said photovoltaic means to control said flow of power from said power source in said remote station to said optical data source in said remote station to permit a sufficient amount of power to flow to said FET from said power source to said optical data laser in said remote station to permit said data laser to lase;

d) means for providing an electrical data signal to said optical data source for conversion to an optical signal for transmission back to said main station from said remote station; and e) means to feed a portion of the optical data transmitted back to said main station from said remote station to said control means in said main station to provide a feedback loop whereby changes in the operating conditions of said apparatus may be compensated for by changes in the electrical control signal transmitted by said control means to said optical control source in response to said optical data transmitted from said optical data laser to said main station.

6. The apparatus of claim 5 wherein said means for feeding a portion of the optical data transmitted to said main station from said optical data laser include optical beam splitter means in said main station.

7. The apparatus of claim 5 wherein said optical control signal from said optical control means in said main station is transmitted to said photovoltaic means in said remote station by a first optical fiber and said optical data transmitted to said main station by said optical data laser in said remote station is transmitted over a second optical fiber.

8. Apparatus for optically transmitting data from a remote source and for optically controlling such data transmission which comprises:

a) means for providing an optical control signal from a main station to a remote station including:
   i) an optical fiber;
   ii) an optical control source in said main station to provide said optical control signal for transmission to said remote station via said optical fiber;
   iii) control means in said main station to control said optical control source, including means for sending an electrical signal to said optical control means;

b) photovoltaic means in said remote station for converting to an electrical control signal said optical control signal transmitted to said photovoltaic means by said optical fiber;

c) power flow control mean sin said remote station for controlling the flow of power from a power source in said remote station to an optical data source comprising a laser in said remote station in response to said electrical control signal from said photovoltaic means, said power flow control means comprising an FET having its gate electrically coupled to said photovoltaic means to control said flow of power from said power source in said remote station to said optical data source in said remote station to permit a sufficient amount of power to flow to said FET from said power source to said optical data laser in said remote station to permit said data laser to lase;

d) means for providing an electrical data signal to said optical data source for conversion to an optical signal for transmission back to said main station from said remote station via said optical fiber; and e) optical beam splitter means provided in both said main station and said remote station for splitting the optical signal being transmitted on said optical fiber.

9. The apparatus of claim 8 wherein said optical control source comprises a control laser for sending an optical control signal from said main station to said photovoltaic means in said remote station in response to an electrical signal from said control means.

10. Apparatus for optically transmitting data from a remote source and for optically controlling such data transmission which comprises:

a) means for providing an optical control signal from a main station to a remote station including:
   i) an optical fiber;
   ii) an optical control source in said main station to provide said optical control signal for transmission to said remote station via said optical fiber;
   iii) control means in said main station to control said optical control source, including means for sending an electrical signal to said optical control means;

b) photovoltaic means in said remote station for converting said optical control signal to an electrical control signal;

c) an FET in said remote station coupled to said photovoltaic means for adjustably controlling the amount of power flowing from a power source in said remote station to an optical data source comprising a laser in said remote station in response to said electrical control signal from said photovoltaic means, said FET having its gate electrically coupled to said photovoltaic means to thereby control said flow of power from said power source in said remote station flowing through said FET to said optical data source in said remote station to turn said laser on and off and to also adjust the amount of power flowing to said laser to thereby adjustably permit a sufficient amount of power to flow to said FET from said power source to said optical data laser in said remote station to permit said data laser to lase; and d) means for providing an electrical data signal to said optical data source for conversion to an optical signal for transmission back to said main station from said remote station.

11. The apparatus of claim 10 wherein said photovoltaic means in said remote station receive power from said power source in said remote station.

12. The apparatus of claim 10 wherein said FET has a substantially linear response to said electrical signal from said photovoltaic means.

13. The apparatus of claim 10 wherein said control means in said main station further comprises means for calibrating said optical data source in said remote station.

* * * * *